United States Patent
Reid et al.

(10) Patent No.: US 6,876,980 B2
(45) Date of Patent: Apr. 5, 2005

(54) METHODS AND SYSTEMS FOR PURCHASING AND INVENTORY OF PAPER AND EXTENDED MEDIA PRODUCTS

(75) Inventors: Paul Reid, New York, NY (US); Henry Ornstein, Brooklyn, NY (US); Helene Turry, Brooklyn, NY (US); Katherine Lamoretti, Island Park, NY (US); Leon M. Misiukiewicz, Summit, NJ (US)

(73) Assignee: Time Inc., New York, NY (US)

( * ) Notice: Subject to any disclaimer, the term of this patent is extended or adjusted under 35 U.S.C. 154(b) by 0 days.

(21) Appl. No.: 10/112,874

(22) Filed: Apr. 2, 2002

(65) Prior Publication Data

US 2002/0156707 A1 Oct. 24, 2002

Related U.S. Application Data (60) Provisional application No. 60/280,108, filed on Apr. 2, 2001.

(51) Int. Cl.[7] .............................................. G06F 17/60
(52) U.S. Cl. .............................. 705/28; 705/10; 705/22; 705/29
(58) Field of Search ............................ 705/28, 22, 10, 705/7; 700/233, 236, 237

(56) References Cited

U.S. PATENT DOCUMENTS

| | | | | |
|---|---|---|---|---|
| 5,410,675 A | | 4/1995 | Shreve et al. ................ 395/500 |
| 5,638,519 A | | 6/1997 | Haluska ....................... 395/228 |
| 5,893,076 A | | 4/1999 | Hafner et al. .................. 705/28 |
| 5,974,395 A | * | 10/1999 | Bellini et al. .................. 705/10 |
| 6,125,352 A | | 9/2000 | Franklin et al. ............... 705/26 |
| 6,151,582 A | * | 11/2000 | Huang et al. .................. 705/10 |
| 6,341,271 B1 | | 1/2002 | Salvo et al. ................... 705/28 |
| 6,401,076 B1 | * | 6/2002 | Hall et al. ..................... 705/22 |
| 6,418,416 B1 | * | 7/2002 | Rosenberg et al. ........... 705/28 |
| 6,449,600 B1 | * | 9/2002 | Zaki .............................. 705/28 |
| 6,587,827 B1 | * | 7/2003 | Hennig et al. ................. 705/1 |
| 2001/0051905 A1 | * | 12/2001 | Lucas ........................... 705/28 |
| 2002/0046125 A1 | * | 4/2002 | Speicher et al. .............. 705/22 |
| 2002/0072986 A1 | * | 6/2002 | Aram ........................... 705/28 |
| 2002/0103726 A1 | * | 8/2002 | Jones et al. ................... 705/28 |
| 2002/0107753 A1 | * | 8/2002 | Laughlin et al. .............. 705/28 |

FOREIGN PATENT DOCUMENTS

| | | | |
|---|---|---|---|
| EP | 0 802 203 A2 | * | 1/1998 |
| GB | 2 265 032 A | * | 9/1993 |

OTHER PUBLICATIONS

Andel, Tom "Partnerships with pull" Jul. 1995 Transportation & Distribution, V36, n7, p65(4) File 148 # 08063720.*

* cited by examiner

*Primary Examiner*—Lynda Jasmin
(74) *Attorney, Agent, or Firm*—Finnegan, Henderson, Farabow, Garrett & Dunner, L.L.P.

(57) ABSTRACT

A system and method in a network-based inventory management system for providing information concerning inventory amounts and inventory ordering to at least one computer. In operation, a server first receives an inventory amount of an item from a first plurality of clients. Next, the server receives an inventory amount of the item from a second plurality of clients. Once the server has the two amounts, it analyzes the inventories at said first and second plurality of computers to determine from which of the first plurality of computers to order the item and to which of the second plurality of computers the ordered item is to be transferred.

16 Claims, 5 Drawing Sheets

FIG. 5

METHODS AND SYSTEMS FOR PURCHASING AND INVENTORY OF PAPER AND EXTENDED MEDIA PRODUCTS

RELATED APPLICATIONS

This application claims priority in U.S. Provisional Application No. 60/280,108, entitled "Method and System for Purchasing and Inventory of Paper and Extended Media Products," filed Apr. 2, 2001.

DESCRIPTION OF THE INVENTION

1. Field of the Invention

The present invention relates to the control and tracking of information related to paper inventory management, and the sharing of paper inventory information over a computer network.

2. Background of the Invention

Prior inventory management systems and methods involved a large number of manually conducted, labor intensive tasks which often led to errors and time delays. While never desirable, errors and time delays are particularly troublesome for the thousands of publishers required to print and distribute time-dependent periodicals on a weekly, bi-weekly, monthly or other basis. Compounding the problem is the fact that even if the inventory supplier provides paper inventory in a timely manner, there is still a possibility that a periodical may not be printed and distributed on time due to delays in printing the periodical at the printer.

In the past, paper inventory management by the paper supplier and printer proceeded independently. At each locations, the determined amount of inventory, which in most instances is not the real-time exact amount due to time delays, is reported to a purchasing agent. The purchasing agent determines if a paper order should be placed and when it should be placed. The purchasing agent then contacts a vendor to determine if the vendor has inventory available. If some inventory is available from that vendor or will be available to satisfy a future requirement, the purchasing agent then places an order that will be filled in due course. The order is placed probably without regard to current market costs, transportation costs, and other peripheral costs, since the inventory is needed to maintain the paper supplier's inventory and operation at the printer's site. If the vendor does not have sufficient inventory, the purchasing agent must find a vendor who has adequate inventory in stock, and may buy from the first vendor with available inventory, again regardless of cost.

Once the supplier has been identified, the order is filled and then transported to each respective destination by truck, rail or boat. Often the location of the in-transit order, its route, potential delays, and other transportation factors are unknown to the purchasing agent and vendor. Accordingly, an exact inventory arrival time is not known and delays cannot be prevented. Further, throughout this entire process, the inventory in each respective site continues to be depleted such that when the in-transit order arrives, it may not be enough to replenish the depleted supplies. Therefore, the order may not meet the needs of the site, and operation of the site may be reduced or halted until an adequate order arrives.

Another deficiency with the prior inventory systems is that the inventory management process does not account for situations in which an external entity (e.g., a publisher) monitors a second or third party's inventory and then makes business decisions based on that party's inventory. For example, a publisher may decide to order paper from Supplier A instead of Supplier B, based on the quantity of inventory stored at Supplier A compared to that stored at Supplier B. The publisher may alternatively decide to place a printer request with Printer A instead of Printer B, based on the quantity of inventory present at Printer A, or the number of outstanding printing requests at Printer A compared to Printer B. A publisher may further decide to order all inventory from a single supplier, regardless of the ultimate printer destination, to take advantage of quantity discounts. Similarly, the publisher may utilize a single printer and multiple suppliers. A publisher may correspondingly make supplier and printer decisions based on factors such as co-location of a printer with a supplier, previous working relationship between a printer and a supplier, etc. Without the capability to communicate between a plurality of printers and suppliers, a publisher or other large consumer of inventory will not be able to fully take advantage of manufacturer capability, supplier capacity, volume discounts, etc.

In the past, many have attempted to automate the ordering processes, however these automated processes have drawbacks. For example, an automatic standing inventory order for a given day may be in place, without regard for the actual, real-time inventory needs. If the printer has been in a slow-down, such as for process overhauls, the on-site inventory may not need replenishing. An order may arrive that exceeds the storage capabilities of the site. The inventory is returned to the vendor, if they will accept a return, and the vendor loses money on the sale. In business, a vendor will accept few, if any, returns of ordered inventory. Alternatively, the ordered inventory stays at the printer or paper supplier in a transport vehicle, and is unused for some period of time. The party that ordered the inventory then incurs costs of storing the unused inventory, rental of the transport vehicle for as long as the inventory cannot be unloaded, and unsold material stored at the either the printer's site or the paper supplier's site, which is uneconomical and undesirable.

Automated computer managed inventory systems have been utilized to overcome some of the above-noted shortcomings. In one system, a vendor-managed inventory system provides that a vendor or supplier watches and predicts inventory use at a manufacturing site, and then delivers inventory to the manufacturing site without requiring a paper order from a purchasing agent. The system however does not provide a capability for a third party (i.e., someone other than the supplier or manufacturer) to order inventory for the manufacturer.

Another system relies upon web-based technology to assist in providing status of material. This system does not provide comparative pricing and purchasing ability for minimizing costs. Also, the system is not believed to provide for transaction between three entities. Accordingly, this system may not provide a low cost price for the material and does not assist in anticipating inventory needs.

Therefore, a system that provides real-time inventory management of supply at a third party site, including comparative pricing and purchasing abilities, would be desirable. Further, a system would be useful that provides an ability to interact and send information to a vendor's manufacturing schedule; forecasts manufacturing based on historical and estimated future requirements; and/or provides a display of data in a useful format to a vendor, customer, manufacturer and/or others that desire the information. An automated vendor managed inventory system of this nature would permit lower total cost and more efficient purchasing, ordering, and delivery of inventory.

SUMMARY OF THE INVENTION

Systems and methods consistent with the present invention satisfy the above-described need by providing a network-based inventory management system for providing information concerning inventory amounts and inventory ordering to at least one computer. In operation, a server first receives an inventory amount of an item from a first plurality of clients. Next, the server receives an inventory amount of the item from a second plurality of clients. Once the server has the two amounts, it analyzes the inventories of the item at the first and second plurality of computers to determine from which of the first plurality of computers to order the item and to which of the second plurality of computers the ordered item is to be transferred.

Additional benefits of the invention will be set forth in part in the description which follows, and in part will be obvious from the description, or may be learned by practice of the invention. The benefits of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present invention and together with the description, serve to explain the principles of the invention. In the drawings.

DETAILED DESCRIPTION

In the following detailed description of a first embodiment, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, not to be taken in a limited sense.

Turning first to the nomenclature of the specification, the detailed description which follows is represented largely in terms of processes and symbolic representations of operations performed by conventional computer components, including a central processing unit (CPU), memory storage devices for the CPU, and connected pixel-oriented display devices. These operations include the manipulation of data bits by the CPU and the maintenance of these bits within data structures residing in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require logical manipulations of physical quantities. Usually, though not necessarily, these quantities take the form of electrical, magnetic, or optical signals capable of being stored, transferred, combined, compared or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no such involvement of a human operator is necessary or even desirable in the present invention. The operations described herein are machine operations performed in conjunction with a human operator or user who interacts with the computer. The machines used for performing the operation of the present invention include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

The operating environment in which the present invention is used encompasses general distributed computing systems wherein general purpose computers, workstations, or personal computers are connected via communication links of various types. In a client-server arrangement, programs and data, many in the form of objects, are made available by various members of the system.

The present invention relates to the control and tracking of information related to paper inventory management, and the sharing of paper inventory information during the course of a business transaction. One typical example of a business relationship utilizing this invention is that relationship existing among a publisher, paper supplier and printer. For purposes of this invention, the term "publisher" may be used interchangeably with the terms "distributor", "customer" or "buyer", and the term "supplier" may be used interchangeably with the terms "manufacturer", "seller", "vendor" or "provider". Business activities include electronic commands or signals generated in response to any and all business developments. For example, a business activity such as a "delivery of goods acknowledgment" may embody a data structure that includes an electronic purchase order number or invoice number, contact person, date of order, date of shipment, goods received, date and place of receipt of goods, etc.

The present invention envisions a scheme whereby conventional control of paper inventory management information and conventional business methods of communication related to the exchange of goods between a manufacturer (paper supplier) and a printer are redefined for modem business needs. The method and system of this invention automatically correlates, adjusts and communicates (shares) a first manufacturer's (or other paper supplier's), and a second manufacturer's (printer or other paper inventory receiver's) electronic business activity and paper inventory management information. For purposes of this description, a second manufacturer may receive goods and services from the first manufacturer, process the goods and services and then transfer the goods and services to a wholesaler, end user, or another manufacturer. While this invention will be described relative to transactions taking place among a publisher, paper supplier and a printer, the invention is not limited to such business relationships, but may be utilized by any business entities requiring electronic sharing of business to business related transaction and/or business control information.

In a first embodiment, the electronic system for controlling and tracking information relating to paper inventory management and the sharing of related business information includes a printer computer, a supplier computer, and a publisher computer. Multiple printer, supplier and publisher computers are each in electronic communication with each other.

The method and system of this invention may provide for immediately updated paper inventory management control information pursuant to received purchase order, purchase order confirmation, shipment information, electronic invoice information, receipt information, price update information, use or consumption information, spoilage information and any other information relating to the printer and supplier relationship. The printer, supplier and publisher computers include a set of instructions or commands defining the method for processing the above information. Under certain system applications, the computer programs resident in the three computers may be identical, with the printer, supplier or publisher computer acting as the control and information sharing center for the system. The business information may be electronically communicated between the publisher computer and the printer computer, between the publisher computer and the supplier computer, or between the printer computer and the supplier computer via varying electronic communication means.

The system provides a method that enables purchase orders (i.e., any orders for paper inventory or other goods), order acknowledgments, advanced shipping notices, orders in transit, receipt acknowledgments, invoices, price discrepancy claims and quantity disputes, overage/shortage claims, debit/credit adjustments, damaged goods claims, inventory usage reports, inventory spoilage reports, and/or related information to be represented electronically and to be electronically processed. The processed information may then be monitored (or shared) by the printer, publisher and supplier computers without the traditional use of paper forms and the time lag inherent in human processing.

The invention is particularly adept at electronically and automatically implementing many of the labor intensive traditional business operations. Communication between a publisher and a printer is essential not only for placement and coordination of printing orders, but also for placement and coordination of finished goods. Communication between a publisher and a supplier is essential for placement and coordination of shipping orders to printers. Communication between a supplier and a printer is essential for coordination and timing of shipping orders. Further, the method and system of this invention automates the process of determining the entity (suppliers and printers) most capable of satisfying expected shipping and printing requirements by requested delivery dates. It is intended that the present invention may also assist in the timely resolution of claims resulting from discrepancies between an order placed and an order received. System performance includes the relatively immediate electronic posting of pertinent business information at a shared facility (e.g., publisher computer) enabling businesses to benefit from a marked increase in communication ability.

The essence of this invention resides in the system's ability to replace as much paper work and human processing associated with inventory transactions as possible with related technology. In addition, this invention provides accurate and timely inventory levels to multiple locations. For example, when a shipment of paper arrives at a printer's location, a computer at the printer's location creates a received shipment report and transmits it to a computer located at the publisher. The publisher's computer then transmits the report to a computer located at the supplier's location. In an alternate embodiment, the received shipment message may be sent by the printer computer to the supplier computer and the publisher computer. In the end, all three entities are aware of inventory levels at the supplier and printer locations, and the publisher (or other central location) can then make informed decisions with respect to future orders.

Referring now to the drawings, in which like numerals represent like elements throughout the several figures, the present invention will be described.

Figure 1:
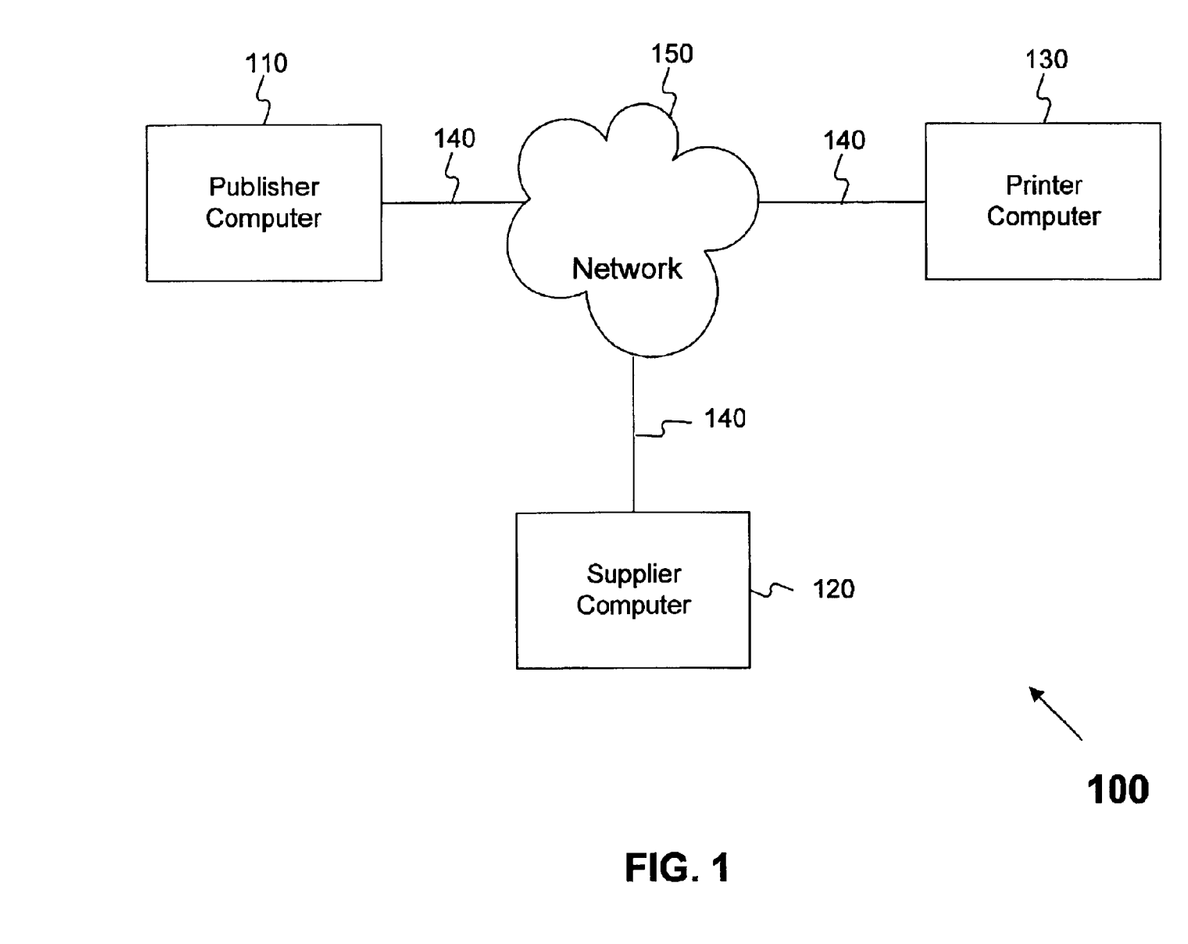
FIG. 1 is a block diagram depicting an illustrative system in which the present invention may be practiced.

FIG. 1 is a schematic block diagram representing a first embodiment of an system 100 for controlling and tracking information related to paper inventory management in accordance with the present invention. Included in the figure are a publisher computer 110, supplier computer 120, and a printer computer 130. Computers 110, 120 and 130 are coupled to a network 150 via communication link 140 to facilitate communication among the publisher, supplier and printer computers. While FIG. 1 depicts three computers coupled to network 150, one of skill in the art will appreciate that any number of computers may be coupled to network 150 without departing from the spirit and scope of the present invention.

Figure 2:
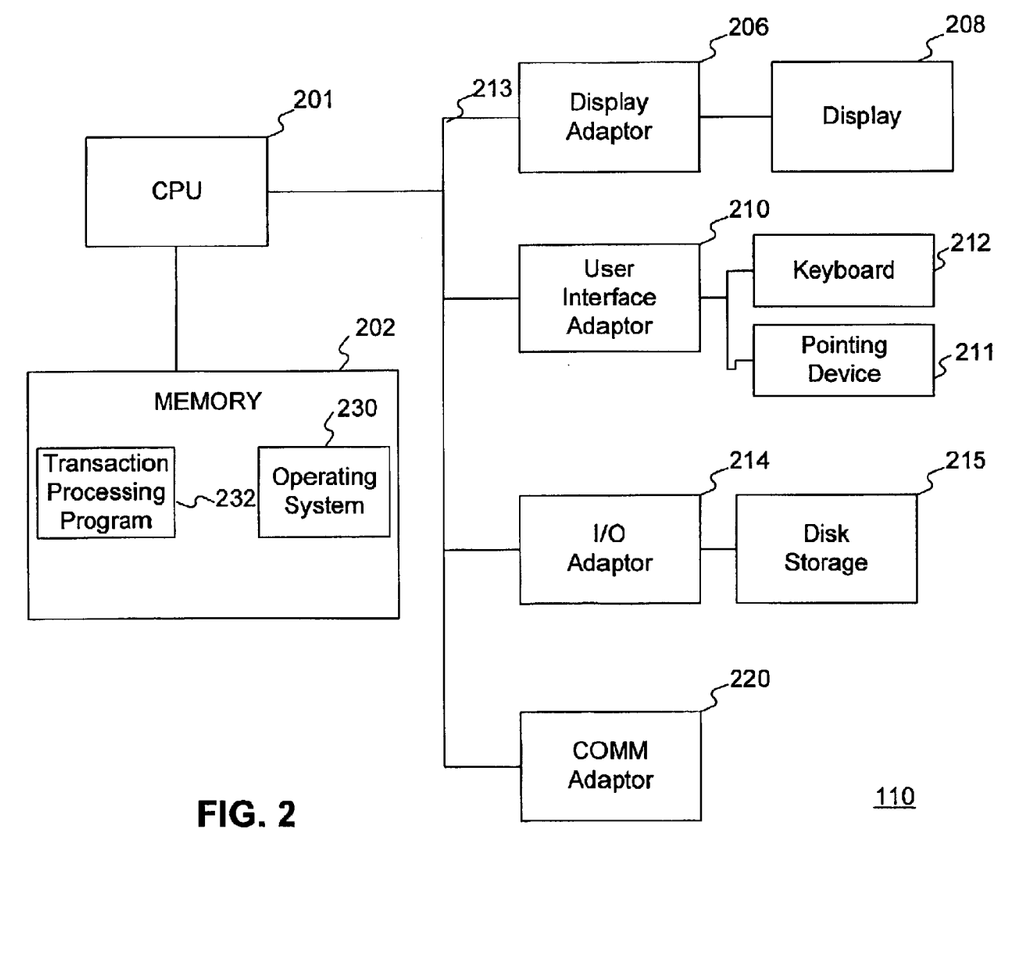
FIG. 2 is block diagram depicting components of a publisher computer in accordance with one embodiment of the present invention.

Referring now to FIG. 2, there is shown a more detailed schematic of publisher computer 110. As shown, publisher computer 110 is comprised of a central processor unit (CPU) 201, a memory 202, a display adapter 206, a display 208, a user interface (UI) adapter 210, a pointing device 211, a keyboard 212, an input/output (10) adapter 214, a disk storage unit 215, and a communications adapter 220 for providing a communications function. Memory 202 includes an operating system 230 for operating the device and a transaction processing program 232 for performing the business control and activity information tracking of the present invention. As shown, the various components of each publisher computer 110 communicate through a system bus 213 or similar architecture. Display adaptor 206 is coupled to display 208, user interface adaptor 210 is coupled to pointing device 211 and keyboard 212, I/O adaptor 214 is coupled to disk storage unit 215 and communications adaptor 220 is coupled to communication link 140 (FIG. 1) for providing connectivity between publisher computer 110 and network 150 (FIG. 1). In addition to, or instead of dedicated memory 202, computer 110 may access a shared database (not shown) accessible by all computers on system 100. There may be other components as well, but these are not shown to facilitate description of the unique aspects of this embodiment of the invention.

Computer 110 may be any computer known to those skilled in the art capable of receiving and running a set of instructions for carrying out the method of this system. Transaction processing program 232 resident in memory 202 of publisher computer 110 defines the set of instructions. Because the system timing and control is software defined, the system may be implemented or modified on any computer having an operating system compatible with the system software. This invention is capable of translating between conventional electronic data interchange (EDI) format, extensible Markup Language (XML) and the data format of the transmitter computer.

The hardware arrangement of this computer, as well as the other computers discussed in this specification are intentionally shown as general, and are meant to represent a broad variety of architectures, which depend on the particular computing device used. In one embodiment, publisher computer 110, supplier computer 120 and printer computer 130 are comprised of identical hardware components but slightly different software programs. In a second embodiment, publisher computer 110, supplier computer 120 and printer computer 130 are comprised of identical hardware and software components. For these reasons and in the interest of brevity, detailed diagrams depicting supplier computer 120 and printer computer 130 will not be repeated. The software programs resident in each computer will be further explained below.

In one embodiment, publisher computer 110 maintains the flow of information in system 100 by accepting and coordinating business activity and tracking information thereby controlling the inventory management process. Publisher computer 110 operates as a director, translator, processor, server and/or distributor of electronic information that may be relevant to both the supplier and printer computers 120 and 130, respectively. Theoretically, the functions performed by publisher computer 110 may be performed by either the supplier or printer computers without departing from the spirit and scope of the present invention.

Figure 3:
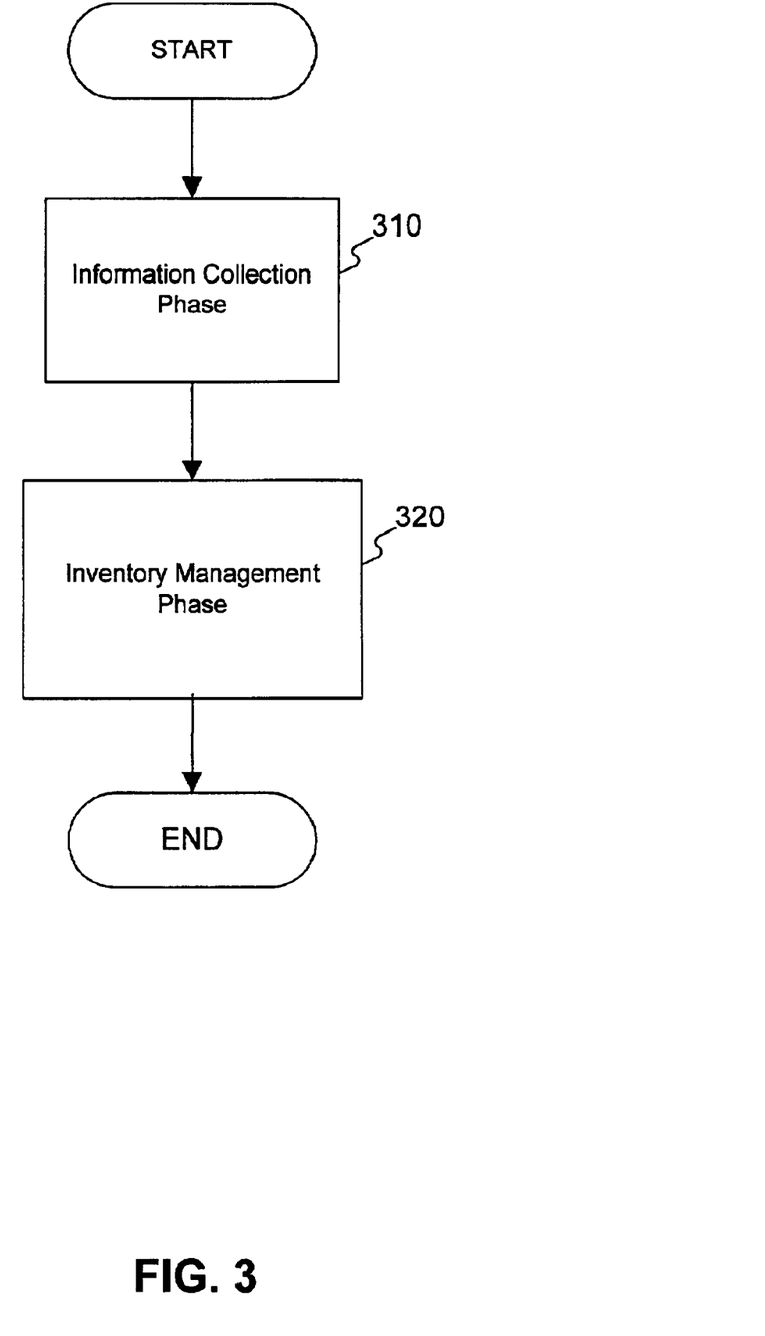
FIG. 3 is a flow diagram depicting the operation of the present invention in accordance with one embodiment.

Referring to FIG. 3, there is shown a flowchart depicting the operation of the invention schematically depicted in FIGS. 1 and 2. As shown, there are two phases of operation: information collection phase 310 and inventory management phase 320. During information collection 310, information is pushed to, or pulled from, other computers on network 150. Once the information is obtained, inventory management 320 begins. In the inventory management 320 phase, computers on network 150 autonomously transmit inventory-related information to a director computer (publisher computer 110, supplier computer 120, or printer computer 130). The director, in turn, analyzes the received information and then makes inventory decisions based on the received information.

Figure 4:
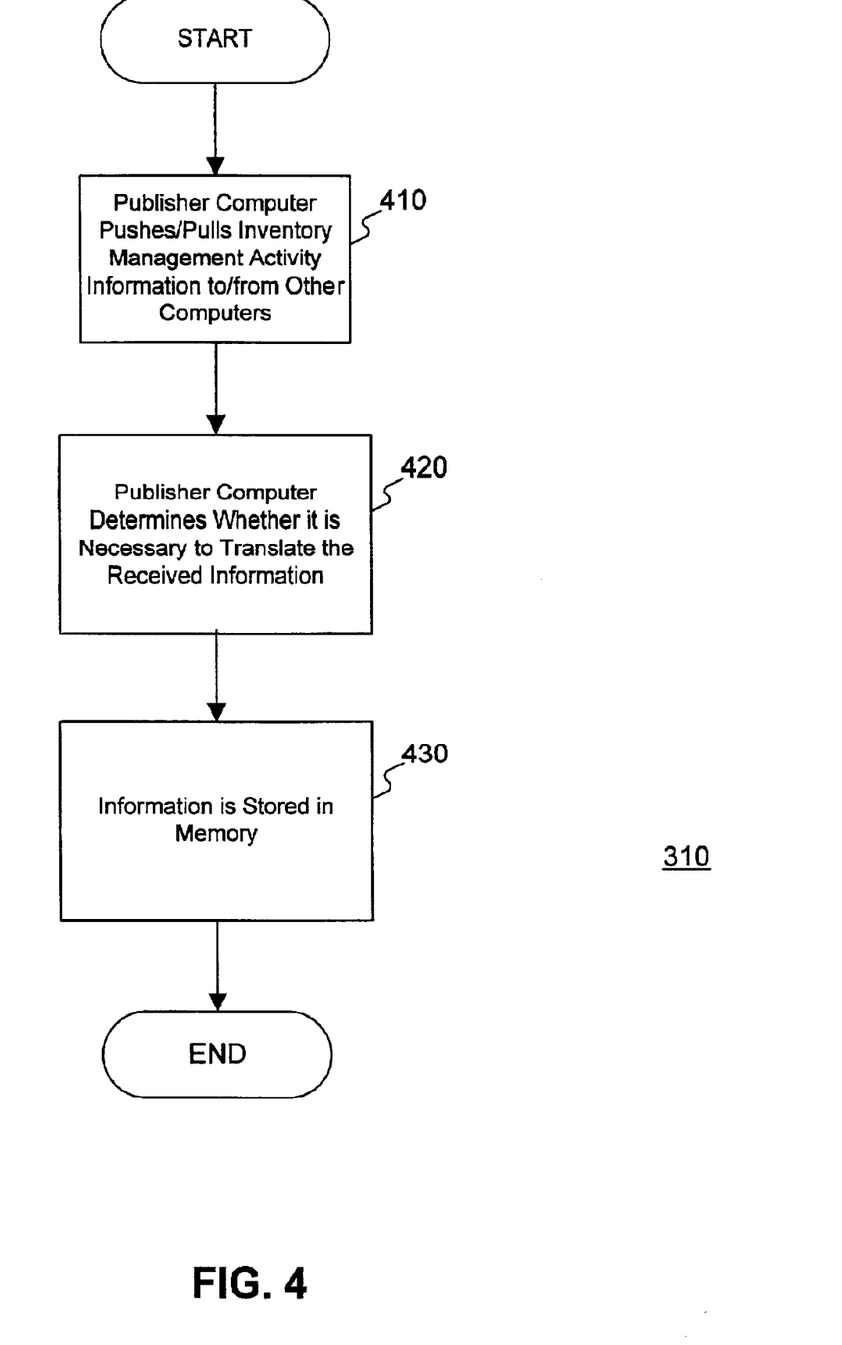
FIG. 4 is a flow diagram of information collection in accordance with one embodiment of the present invention.

Referring now to FIG. 4, there is shown a more detailed flow depicting the steps performed during the information collection phase 310. As shown, processing begins in step 410 when publisher computer 110 pulls information, or is pushed information, from supplier computer 120 and printer computer 130 for inventory management activity information (electronic information) via electronic data link 140. The electronic information request directed to supplier computer 120 may request information relating to inventory levels in the warehouse, or claim information relating to a receipt of damaged goods, overage or shortage of goods, order acknowledgments, billing information and/or most other inventory management information. The information request for printer computer 130 may additionally contain requests for information relating to the printer's completion status of pending orders and capability to satisfy future orders.

Generation of the electronic information may be carried out by any known technique. The electronic information may be identified with and correlated to an existing electronic order, whether or not the information is in a conventionally available data format. For example, the information may be transmitted in EDI, XML, ASCII, or EBCDIC formats. When the information is received, processing flows to step 420 where publisher computer 110 determines the format of the information and then determines whether it is necessary to translate the information into an alternate format. If the electronic transaction information is provided in EDI format, the information must be translated. The data structure of the information may be adjusted for compatibility, including removing particular control characters utilized for the transmission of the electronic invoice via an EDI-based network. Once the information is translated (if necessary) processing flows to step 430 and the information is stored in memory 202 or on a mass storage device (not shown).

In another embodiment, publisher computer 110, supplier computer 120 and printer computer 130 run client and server software that allow a user at the computer to browse information stored on another computer, gather information relating to inventory management, selectively store information in a database, and transmit information to system 100. In order to carry out the communication function, a standard Web browser (e.g., Microsoft Internet Explorer or Netscape Navigator) may execute in memory 202. Publisher computer 110, supplier computer 120 and printer computer 130 may also incorporate a JAVA virtual machine or other processor that links to a server through the Internet for communication purposes. In operation, a user at a first computer may use the Web browser to interpret an XML document (i.e., a collection of data encoded in compliance with XML) transmitted by a second computer. The Web browser interprets the XML document and creates a page-oriented representation of the document on display 208. The document may, for example, present textual information to the user relating to inventory levels, damaged goods, in-transit supplies, etc.

Generally, user-selectable options ("hypertext links") are also presented within the XML document which, if selected by the user using pointing device 211 or keyboard 212, cause the computer to retrieve additional XML documents providing related or more detailed information. For example, when a user reviews an advance shipment notice via a web page, the user may be transferred to another web page that represents the purchase order that that shipment is fulfilling.

Figure 5:
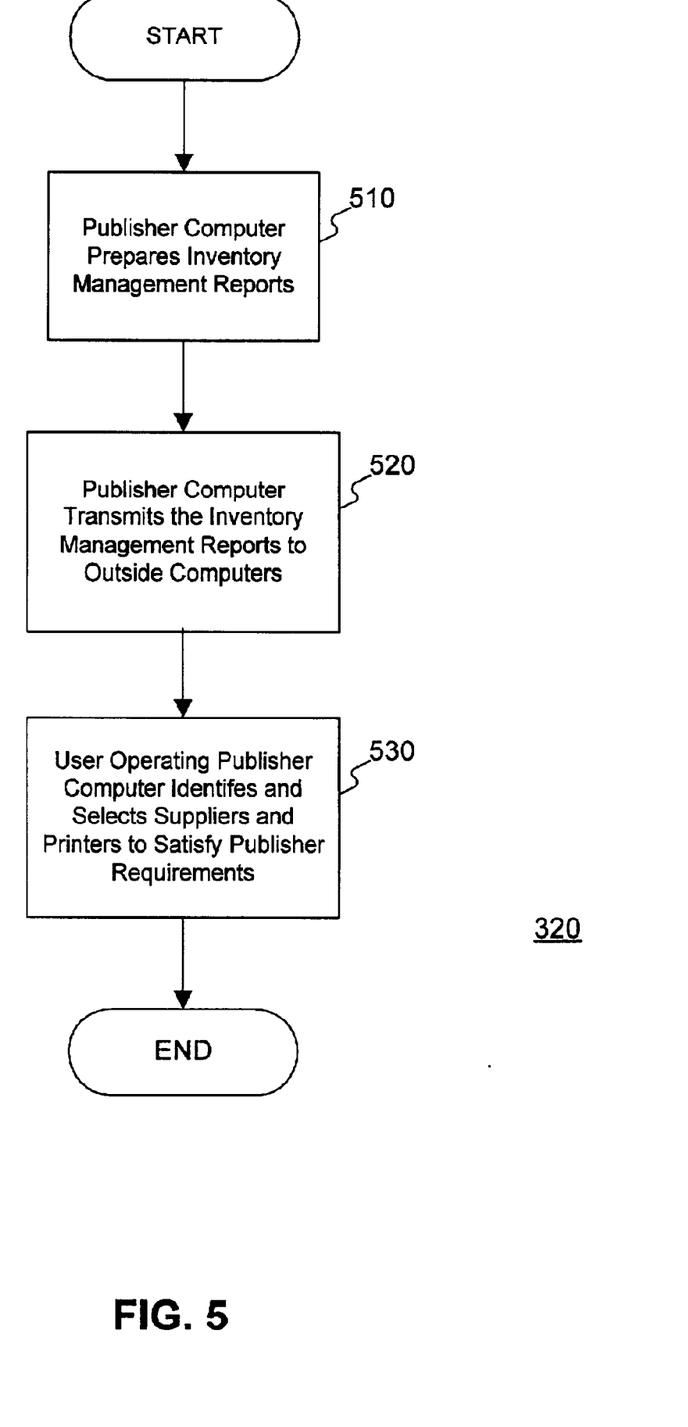
FIG. 5 is a flow diagram of inventory management in accordance with one embodiment of the present invention.

Referring to FIG. 5, there are shown the steps performed by the present invention during the inventory management phase 320. Inventory management phase 320 is characterized by the process in which a plurality of computers autonomously transmit messages indicative of an inventory event (e.g., inventory leaving the supplier; inventory arriving at the printer; inventory usage; spoilage or waste; and goods received). When publisher computer 110 or the director computer receives information from supplier computer 120 and printer computer 130, processing flows to step 510 where publisher computer 110 may prepare inventory management reports. Next, processing flows to step 520 where publisher computer transmits the inventory management reports to supplier computer 120 and printer computer 130. Each time an inventory management report is received from the supplier or printer, the information may be processed by publisher computer 110 such that a shadow inventory is maintained by the publisher computer. Publisher computer may then use the shadow inventory to assist in the decision-making process, and it may provide the shadow inventory to printer and supplier computers. With the shadow inventory, a user operating publisher computer 110 may intelligently identify and select suppliers and printers to satisfy the publisher's requirements (step 530). For example, if the inventory stored at a first supplier is low, and inventory at a second supplier is near full capacity, publisher computer 110 will identify this fact and route future requests for supplies to the second supplier.

In a more detailed example of this process, a plurality of supplier computers 120 may transmit inventory level activity to publisher computer 110. The information would be processed and an order created by publisher computer 110, sending notification to both the printer and supplier computers. Upon processing an order and shipping paper supplies to a printer, supplier computer 120 may send shipping activity information to publisher computer 110. Publisher computer 110 may then send the shipping activity information to printer computer 130. In a second embodiment, supplier computer 120 may send the shipment information directly to the publisher computer 110 and printer computer 130.

Upon receipt of the shipment (i.e., the paper), the printer computer 130 may send activity information to publisher computer 110. If a claim associated with the shipment requires processing, such as a claim for damaged goods, shortage or overage, or any other normal business exception, the information related to the activity is sent from the printer computer 130 to the publisher computer 110, which processes the information and generates an appropriate inventory management report, sending the same to both the supplier computer 120 as well as to the printer computer 130. In a second embodiment, a claim message may be sent directly from the printer (or supplier) computer to the other computers.

From the foregoing description, it will be appreciated that the present invention provides an efficient system and method for purchasing and inventory of paper over a computer network. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Although aspects of the present invention are described as being stored in memory, one skilled in the art will appreciate that these aspects can also be stored on or read from other types of computer-readable media, such as secondary storage devices, like hard disks, floppy disks, or CD-ROMs; a carrier wave from the Internet; or other forms of RAM or ROM. Similarly, the method of the present invention may conveniently be implemented in program modules that are based upon the flow charts in FIGS. 3–5. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method in a network-based inventory management system for providing information concerning inventory amounts and inventory purchasing from at least one server, the method comprising:

receiving, by the at least one server, an inventory amount of an item from a first plurality of supplier computers;

receiving, by the at least one server, an inventory amount of said item from at least a second plurality of processor computers;

receiving, by the at least one server, an inventory amount of said item from at least a third plurality of manufacturer computers;

analyzing, by the at least one server, the inventories at said supplier computers and said processor computers to determine from which of the supplier computers a purchaser will purchase the item and to which of the processor computers the purchased item is to be transferred; and after the purchaser purchases the item, transferring the purchased item to a manufacturer associated with the determined processor computer, wherein the manufacturer converts the item into a second item.

2. The method of claim 1, wherein the first plurality of supplier computers are associated with paper suppliers.

3. The method of claim 1, wherein the second plurality of processor computers are associated with printers.

4. The method of claim 1, wherein the analyzing step further comprises:

identifying one of the first plurality of supplier computers, wherein said supplier computer is associated with a sufficient inventory of the item;

identifying one of the second plurality of processor computers, wherein said processor computer is associated with an inventory demand that is greater than its current inventory; and transferring the item from said one of the first plurality of supplier computers to one of the second plurality of processor computers.

5. The method of claim 1, further comprising the step of processing the item at the manufacturer.

6. The method of claim 1, wherein the analyzing step includes:

analyzing:

the inventory levels at the first plurality of supplier computers and the second plurality of processor computers;

a distance between at least one of the first plurality of supplier computers and at least one of the second plurality of processor computers;

any pre-existing commitments to purchase the item from one of said first plurality of supplier computers; and manufacturing capabilities of the first plurality of supplier computers and the second plurality of processor computers; and determining from which of the first plurality of supplier computers to purchase the item and to which of the second plurality of processor computers the purchased item is to be transferred.

7. A method in a network-based inventory management system for providing information concerning inventory amounts and inventory purchasing from at least one server, the method comprising:

requesting, by the at least one server, an inventory amount of an item from a first plurality of supplier computers;

requesting, by the at least one server, an inventory amount of said item from at least a second plurality of processor computers;

requesting, by the at least one server, an inventory amount of said item from at least a third plurality of manufacturer computers;

analyzing, by the at least one server, the inventories at said supplier computers and said processor computers to determine from which of the supplier computers a purchaser will purchase the item and to which of the processor computers the purchased item is to be transferred; and after the purchaser purchases the item, transferring the purchased item to a manufacturer associated with the determined processor computer, wherein the manufacturer converts the item into a second item.

8. The method of claim 7, wherein the first plurality of supplier computers are associated with paper suppliers.

9. The method of claim 7, wherein the second plurality of processor computers are associated with printers.

10. The method of claim 7, wherein the analyzing step further comprises:

identifying one of the first plurality of supplier computers, wherein said supplier computer is associated with a sufficient inventory of the item;

identifying one of the second plurality of processor computers, wherein said processor computer is associated with an inventory demand that is greater than its current inventory; and transferring the item from said one of the first plurality of supplier computers to one of the second plurality of processor computers.

11. A computer system for providing information concerning inventory amounts and inventory purchasing from at least a second computer, comprising:

a memory having program instructions; and a processing component configured to use the program instructions to:

receive an inventory amount of an item from a first plurality of supplier computers;

receive an inventory amount of the item from at least a second plurality of processor computers;

receive an inventory amount of the item from at least a third plurality of manufacturer computers; and analyze the inventories at said supplier computers and said processor computers to determine from which of the supplier computers a purchaser will purchase the item and to which of the processor computers the purchased item is to be transferred; and after the purchaser purchases the item, transferring the purchased item to a manufacturer associated with the determined processor computer, wherein the manufacturer converts the item into a second item.

12. The computer system of claim 11, wherein the first plurality of supplier computers are associated with paper suppliers.

13. The computer system of claim 11, wherein the second plurality of processor computers are associated with printers.

14. The computer system of claim 11, wherein the instruction to analyze the inventories further comprises the following instructions:

identifying one of the first plurality of supplier computers, wherein said supplier computer is associated with a sufficient inventory of the item;

identifying one of the second plurality of processor computers, wherein said processor computer is associated with an inventory demand that is greater than its current inventory; and transferring the item from said one of the first plurality of supplier computers to one of the second plurality of processor computers.

15. The computer system of claim 11, further including the instruction to process the item at a location corresponding to the manufacturer.

16. The method of claim 11, wherein the instruction to analyze the inventories further comprises the following instructions:

analyze:

the inventory levels at the first plurality of supplier computers and the second plurality of processor computers;

a distance between at least one of the first plurality of supplier computers and at least one of the second plurality of processor computers;

manufacturing capabilities of the supplier and of processor computers; and any pre-existing commitments to purchase the item from one of said first plurality of supplier computers; and determine from which of the first plurality of supplier computers to purchase the item and to which of the second plurality of processor computers the purchased item is to be transferred.

* * * * *